DISPENSING APPARATUS

Original Filed Feb. 6, 1969 4 Sheets-Sheet 1

INVENTORS
FREDERICK W. HUDSON
WILLIAM C. EMERSON
BY
ATTORNEY

United States Patent Office

Re. 27,876
Reissued Jan. 8, 1974

27,876
DISPENSING APPARATUS

Fredrick W. Hudson, West Henrietta, and William C. Emerson, Rochester, N.Y., assignors to Xerox Corporation, Rochester, N.Y.

Original No. 3,596,807, dated Aug. 3, 1971, Ser. No. 796,964, Feb. 6, 1969. Application for reissue Aug. 25, 1972, Ser. No. 283,882
Int. Cl. G01f *11/20*
U.S. Cl. 222—181 6 Claims

Matter enclosed in heavy brackets [ ] appears in the original patent but forms no part of this reissue specification; matter printed in italics indicates the additions made by reissue.

ABSTRACT OF THE DISCLOSURE

A disposal-dispensing unit for dispensing particulate material in which a substantially enclosed container having an opening in the bottom thereof is sealed by a resilient open-celled elastomeric roll which is rotatably supported in biasing contact with the walls of said opening to retain particulate material therein. Further means are provided exterior the container for rotating the roll sequentially through the toner material in the container wherein the open-celled cavities on the roll surface are uniformly loaded with particulate material, and then past at least one biasing wall where the roll surface is deformed sufficiently to force the particulate material from the roll surface into the dispensing opening.

*This application is a reissue of the U.S. Pat. No. 3,596,807, issued Aug. 3, 1971.*

This invention relates to improvements in apparatus for dispensing finely divided powders or granular materials and, in particular, to improvements in xerographic toner-dispensing apparatus.

More specifically, this invention relates to a xerographic toner container having dispensing means associated therewith that is particularly adapted for use in conjunction with a xerographic developing apparatus. Basically, in the art of xerography, a plate formed of a photoconductive surface placed over a conductive backing is uniformly charged and the surface of the plate then exposed to a light image of an original which is to be copied. The photoconductive layer becomes conductive under the influence of the light image to selectively dissipate the charge found thereon thus forming a latent electrostatic image. To make this latent image visible, a finely divided pigmented resin-based material, commonly referred to as toner, is first charged to a potential opposite to that of the latent electrostatic image and then while still in a charged state, brought into contact with the latent image where the charged toner particles are attracted to the image areas. The developer image is usually transferred from the plate surface to a final support material and fixed thereto to form a permanent record of the original.

The resin-based toners employed in the practice of the xerographic process are generally blended from finely subdivided materials to yield an extremely fine powder composition having an average particle size of about 10 microns. As used in most automatic xerographic reproducing apparatus, the fine toner particles are brought into rubbing contact with a triboelectrically remote and relatively coarser "carrier" material. The rubbing or mixing action causes the toner particles to become triboelectrically charged to a polarity opposite that of the carrier. The charged toner particles electrostatically coat themselves on the surface of the coarser carrier material and remain bonded there in a charged state. The two-component material is then brought into contact with an image bearing photoconductive plate where the toner is electrostatically transferred from the carrier surface to the latent image areas to effect development. As can be seen, the coarser carrier particles not only provide a means for charging the toner material but also provide a vehicle by which the toner particles are conveniently handled and transported in the xerographic development apparatus.

In order to sustain continuous operation in an automatic device, the toner material consumed in the development process must be periodically replaced within the development system. New toner material has heretofore been packaged in supply bottles or containers and the material poured directly from the container into dispensing apparatus associated with the automatic developing equipment. This pouring process has proven to be wasteful and dirt producing because some airborne toner particles migrate away from the intended receiving device onto the surrounding area where they clog machine parts or soil equipment and/or clothing. Furthermore, with the advent of new and faster xerographic processing equipment, it has been found that most known devices for dispensing this particulate material are incapable of handling and uniformly dispensing large amounts of material in the short period of time required to maintain the developer ratio at the desired level.

It is therefore a primary object of this invention to improve apparatus for handling and dispensing of finely divided particulate materials.

A further object of this invention is to improve automatic xerographic development apparatus by minimizing the handling of xerographic toner materials.

Another object of this invention is to provide a relatively dirt-free toner container and dispensing apparatus for adding new toner material to an automatic xerographic developing apparatus.

These and other objects of the present invention are attained by means of a substantially enclosed container arranged to support a quantity of finely divided particulate material, the container having an opening therein through which the material is dispensed, a cylindrical dispensing roll formed of a resilient foamed elastomeric material having a textured outer surface formed of a plurality of open-celled cavities adapted to receive and support therein particulate material, means to rotatably support the roll within the container, in or adjacent to the opening with the roll surface in biasing contact with the interior wall surface of the container to form a movable seal for retaining particulate material within the container, means operatively connected to the roll to rotate the roll sequentially through the material in the container to load the open-celled cavities and then past at least one of the biasing surfaces wherein the surface of the roll is deformed sufficiently to cause toner thereon to be dispensed from the roll surface into the dispensing opening.

For a better understanding of the present invention as well as other objects and further features thereof reference is had to the following description of the invention to be read in conjunction with the accompanying drawings, wherein:

FIG. 1 illustrates schematically a preferred embodiment of the xerographic apparatus adapted for automatic and continuous operation and incorporating a toner container and dispensing apparatus in accordance with the present invention;

FIG. 2 is a partial elevation in partial section showing the toner container and dispensing apparatus of the present invention mounted in operative relation with the xerographic developer housing illustrated in FIG. 1 showing the toner container having an opening in the end wall thereof through which the contents of the container may be replenished with new material without removing the container from the developer housing.

Figure 1:
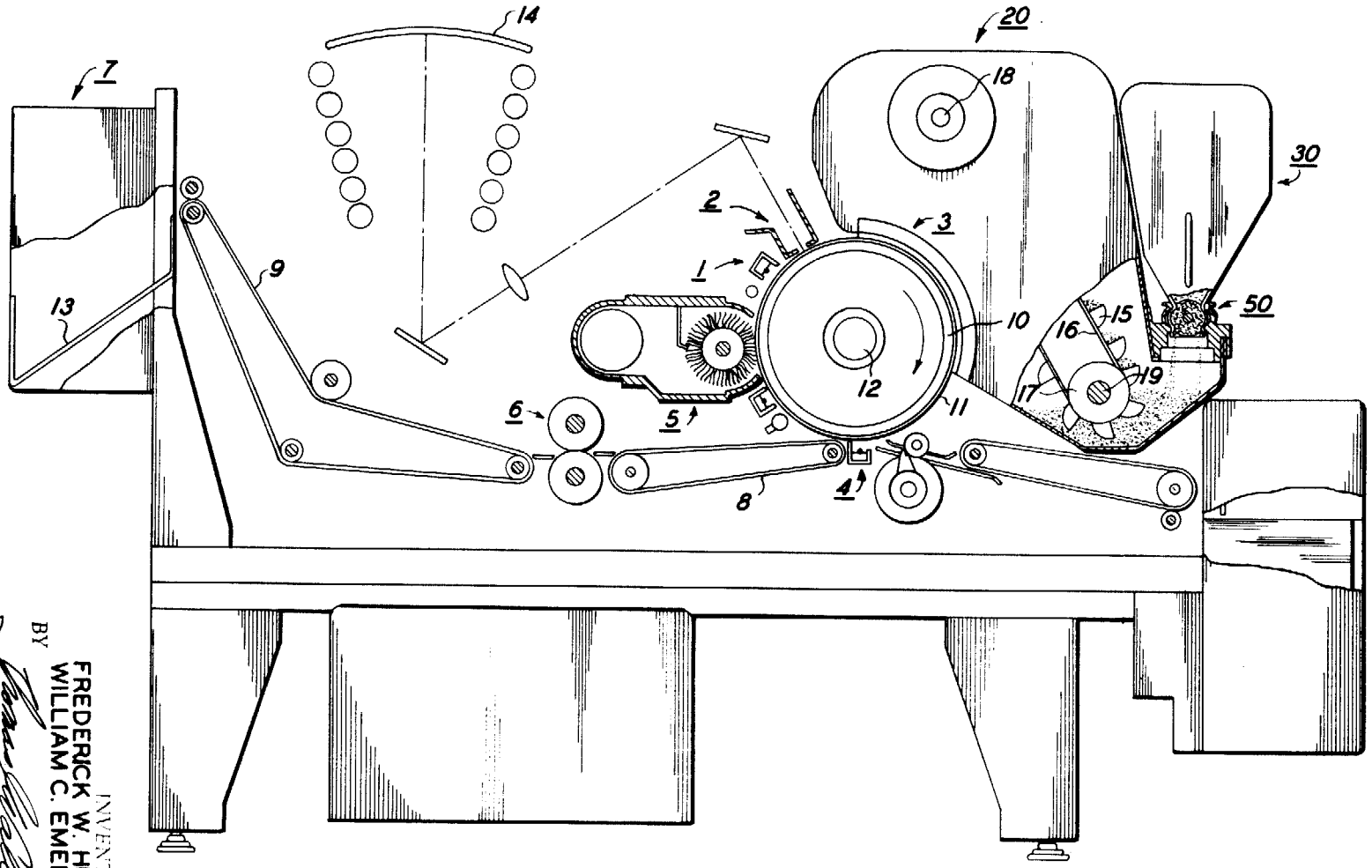

Referring now to FIG. 1, there is shown an embodiment of the subject invention in the suitable environment such as an automatic xerographic reproducing machine having a xerographic plate including a photoconductive layer 10 placed on a conductive backing and formed in the shape of a drum 11. The drum is mounted on shaft 12 which is journaled for rotation in the machine frame so as to rotate in the direction indicated by the arrow thus causing the drum surface to sequentially pass through a plurality of xerographic processing stations.

For the purpose of the present disclosure, the several xerographic processing stations in the path of movement of the drum surface may be described functionally as follows:

A charging station 1, at which a uniform electrostatic charge is deposited on the photoconductive layer of the drum surface;

an exposure station 2, at which a light or radiation pattern of an original document supported on platen 14 is projected through means of a mirror and lens projection system onto the surface of the drum to dissipate the charge found therein in the exposed areas thus forming a latent electrostatic image;

a developing station 3, at which a two-component xerographic developing material including toner particles having an electrostatic charge opposite to the electrostatic latent image on the drum surface are cascaded over the drum wherein the toner particles are attracted into the electrostatic latent image areas to form a xerographic powder image in the configuration of the original document supported on the platen;

a transfer station 4, at which the xerographic powder image is brought into contact with a final support material and is electrostatically transferred from the drum surface 11 to a final support and the final support stripped from the drum and forwarded along vacuum transport 7; a drum cleaning and discharge station 5, at which the drum surface is brushed to remove residual toner particles remaining thereon after image transfer and at which time the drum surface is exposed to a light energy source to effect substantially complete discharge of any residual electrostatic image remaining thereon.

After transfer, the image-bearing support material is transported by means of vacuum transport 8 to a fixing station 6 wherein the support material is passed between a pair of cooperating fuser rolls adapted to deliver a combination of pressure and heat to the image-bearing surface of sufficient magnitude to permanently fix the image to the support. Upon leaving the fuser rolls, the final support material is transported by means of a second vacuum transport system 9 to a copy discharge station 7 where the copy is collected and stored in copy tray 13.

In the specific arrangement shown in FIG. 1, a developer conveyor system including a plurality of transverse buckets 15 that are horizontally supported between two endless belts 16 positioned on opposite sides of the developer housing 20 and which extend over pulleys 17 that are fixed upon transverse shafts 18 and 19. For actuating the toner conveyor system, upper shaft 18 is driven through means of a belt and motor arrangement (not shown) that causes the conveyor system to be rotated in the direction indicated while the machine is in operation. The developer material conveyed upwardly by the conveyor system is discharged into an entrance chute (not shown) that extends transversely across the entire developing system structure and which also extends downwardly to direct the flow of developer material into contact with the moving xerographic drum surface where, as noted above, the toner particles are electrostatically pulled away from the carrier components and deposited on the drum surface to develop the latent image. The toner deplete carrier particles then pass off the drum surface and are directed back into the lower sump of developer housing 20. As the toner powder images are formed, additional toner particles must be supplied to the developer material in proportion to the amount of toner deposited on the drum surface. To supply additional toner to the developer material there is provided a toner-dispensing unit comprising a container 30 and a dispensing apparatus 50 that constitutes one form of the subject matter of the present invention.

It is believed that the foregoing description is sufficient for purposes of the present application to show the general operation of the xerographic reproducing apparatus employing a toner container and dispensing apparatus constructed in accordance with the present invention. Although not shown, suitable drive means are also provided to drive the drum, sheet feed mechanisms, developer conveyors, and other operating mechanisms at predetermined speeds relative to each other for proper machine operation. For further details concerning specific construction of the xerographic apparatus shown herein, reference is had to U.S. Pat. No. 3,301,126 issued in the name of Robert S. Osborne, et al.

In connection with the function and manner of operation of the toner dispensing unit herein disclosed, it is deemed desirable at this point to briefly discuss the problems and terms related to the handling and dispensing of fine particulate material. As previously noted, because of its nature, finely divided material is extremely difficult to handle and uniformly dispense. Another interesting characteristic associated with minute toner particles is that under certain conditions closely related to humidity and temperature the toner particles will agglomerate or pack together so tightly that they will literally become a solid mass. The agglomeration of powder particles may also be effected as a result of cold flow, that is, although the particles may not be at a sufficiently high temperature, the material may be viscous enough to cause the particles to weakly adhere to each other. In any event, toner material supported within a container as herein disclosed is capable of blocking or forming bridges therein which will impede the normal downward flow of material.

In the form of the invention as illustrated in FIGS. 2–5, a toner-dispensing unit of the present invention includes a container 30 constructed of two substantially parallel end walls 42 and 43, two sidewalls 54 and 55, and a top surface 56 that are integrally connected to their respective corners to form a substantially enclosed receptacle. The bottom portions of the two sidewalls are turned inwardly and cooperate with the end walls to form an elongated opening 48 in the bottom of the container. The inclined surface of the sidewalls function to direct particulate material supported within the container downwardly towards the bottom opening 48. Preferably the container is formed of a blow-molded thermoplastic material which is relatively rigid at room temperatures. Typical resin-based materials from which this type of container can be molded are polypropylenes, polyethylenes, chlorinated polyethers, acrylonitrile butadine styrene, polystyrene, acetates, fluorocarbons, and methyl methacrylate. Care should be taken however to select the thermoplastic resin from a group of thermoplastic materials which are chemically inert in respect to the composition of the particulate material supported therein.

The dispensing apparatus 50 includes a dispensing roll 51 adapted to support a quantity of particulate material thereon which is mounted within the container on shaft 52 so that the roll is adjacent to the dispensing opening 48. The roll is securely affixed to the shaft, as for example by gluing and the shaft journaled for rotation in bearing blocks 54 and 57 provided in the lower end walls of the container. The left-hand end 54 (FIG. 4) of shaft 52 extends through the end wall of the container and has a series of parallel axially aligned recesses (not shown) machined therein which are adapted to receive a drive means in operative relation therein. The dispensing roll can be formed from any number of foamed elastomeric materials having a textured open-celled surface structure made up of a mass of small hollow cavities capable of receiving and supporting a quantity of particulate material therein. Typical examples of foamable materials that can be formed in open-celled configuration are polyurethanes, polyvinyl chloride, silicones, polystyrenes, styrene acrylonitrile, cellulose acetate, and phenolics. Foaming of these materials can be accomplished either by mechanical frothing, physically dissolving a gas or liquid within the resin material, or chemically incorporating a foaming or blowing agent directly into the material which is capable of releasing an inert gas within the resin when the temperature is increased.

A typical roll for use in this preferred embodiment of the present invention is one fabricated of a urethane foam. Urethane foams are cellular plastics formed by the reaction of a polyol and isocyanate, generally in the presence of a catalyst. The two materials react rapidly in the presence of tertiary amines, in combination with stannous or other metallic salts, to produce a material which is relatively strong yet resilient at room temperature. The term resiliency is used herein to describe the property of a material which has been deformed to rapidly recover its original posture after the force of deformation is removed. It is found that by varying the ratio of raw materials and the foaming conditions, a flexible polyurethane foam having a broad spectrum of desired end properties can be produced. For example, cell formation can be stabilized by chemically foaming the urethane in the presence of a surfactant capable of controlling the size of the gas bubbles to promote uniform cell formation. Silicones and/or organic surfactants, generally ionic, are widely used to control the expansion of gas bubbles. It has been found that by properly choosing materials and by controlling cell structure, it is possible to form a foamed polyurethane dispensing roll of high tensile strength and having good resiliency which is capable of delivering a uniform amount of toner into a developer mix when employed as herein described.

Figure 5:
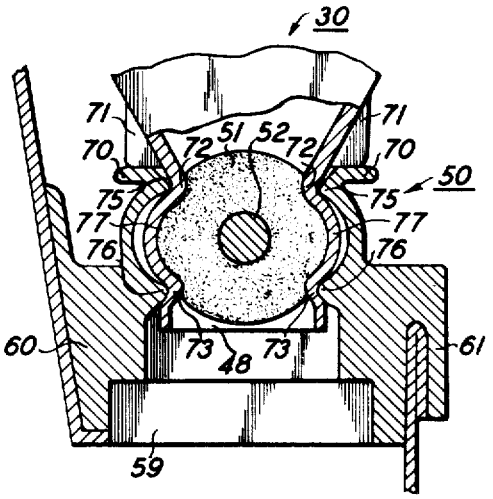
FIG. 5 is an enlarged end view in section showing the toner dispenser roll and associated biasing mechanism illustrated in FIG. 2.

Formed as a dependent part of each of the container sidewalls are two elongated bosses 55 and 56 (FIG. 5) extending horizontally across the width of the container in substantially parallel relationship. The two upper bosses 55 are positioned interior the container while the two lower bosses are positioned adjacent to the dispensing opening. As illustrated in FIG. 5, the protruding bosses extend outwardly from the inner wall surfaces to depress, or mechanically bias, the curved surface of the resilient roll. The two parallel ends of roll 51 are also biased into contact with the interior flat surface of end walls 42 and 43 so that the entire periphery of the roll is in contact with the interior surface of the container. Sufficient pressure is maintained between the roll and the interior of the container to prevent unwanted toner from passing therebetween. In effect, the resilient roll functions to form a movable seal capable of retaining toner material within the container. In practice, it has been found that a polyurethane roll having an outside diameter of about 1.125 inches is capable of forming a seal in the bottom of a blow-molded container as herein described to prevent toner particles of an average size of approximately 10 microns from passing between the roll surface and the interior surface of the container when the peripheral roll surface is depressed to a depth of approximately 1/16 of an inch.

The dispensing unit, comprising toner container 30 and dispensing roll 50 supported therein, is operatively mounted upon the developer housing 20 in a condition whereby the toner in the container can be directly dispensed into the developer mix supported within the housing. A pair of support members 60 and 61 are securely affixed to the sidewalls of the developer housing as for example by welding. The support members extend horizontally across the width of the housing and cooperate to define an elongated opening 59 into which container 30 can be slidably received. The top surfaces of the support members are turned to form horizontal flanges 70 which are arranged to coact with support surfaces 71 formed in the exterior sidewalls of the container to hold the container in an upright position when mounted on the developer housing. Two upper rails 75 and two lower rails 76 are formed on the interior surfaces of the support members and extend horizontally across the opening 59. The rails are arranged to contact the arcuate section 77 in the lower side walls of the container and function to guide and further support the container when the container is situated between the support members. One end of the opening described by the support members is open to receive the container in sliding relationship between the rails. The opposite end of the opening is closed by means of end plate 63.

To operatively mount the container on the developer housing, the arcuate portions 77 of the container sidewalls are inserted between the guide rails and the container surfaces 71 securely seated on horizontal flanges 70. The container is then moved laterally along the rails until container end wall 43 is arrested by end plate 63. With end wall 43 seated against end plate 63, opening 48 of the container is aligned with opening 59 in the developer housing and the container is now in a condition to dispense toner material directly into the developer mix therein. Hand holds 32, which are formed in the top of the container, and handle 31 affixed to end wall 42 are provided to facilitate insertion and removal of the container between the support members.

Figure 3:
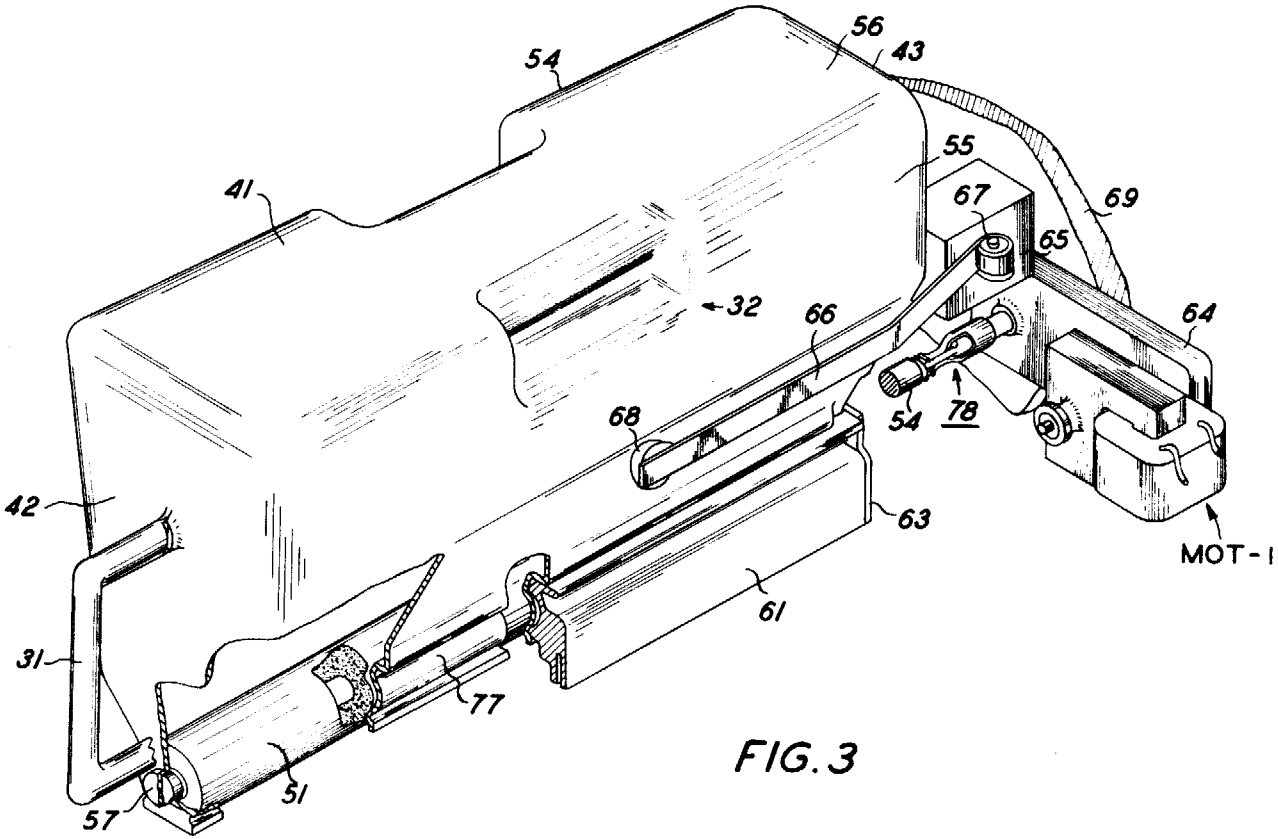
FIG. 3 is a perspective view of the toner dispenser of the present invention illustrated in FIG. 1 partially broken away to illustrate several elements of the mechanism and showing a suitable dispenser drive means and a bridge-eliminating mechanism.
Figure 4:
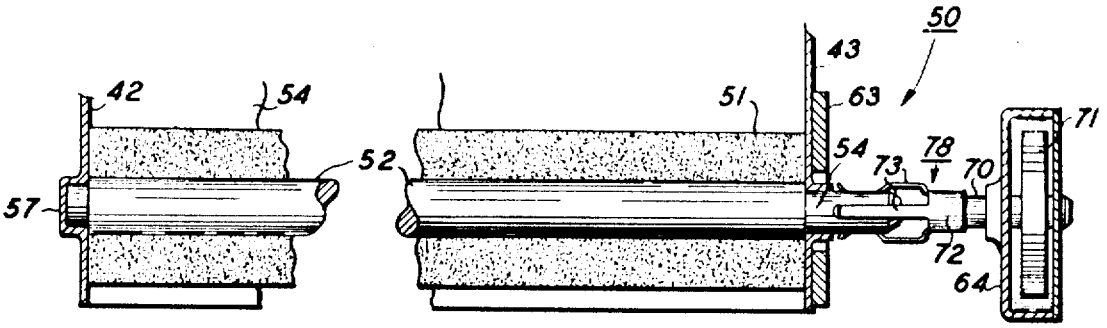
FIG. 4 is a side view of the toner dispenser of the present invention taken along lines 4—4 shown in FIG. 2.

When the container is mounted upon the support members as described above, the extended portion 54 of the shaft 52 passes through end plate 63 and is coupled to drive shaft 70 by means of coupling 78. The hub end 72 of the coupling is pinned to drive shaft 70. A series of flexible arms 73 are positioned circumferentially about the hub. As shown in FIG. 4. the free ends of the arms are turned outwardly to permit the extended end of shaft 52 to be inserted therebetween. The flexible arms are arranged to ride in the recesses machined in the end of shaft 52 to translate the rotation motion of the drive shaft 70 to the dispensing shaft 52. Shaft 70 is journaled in drive housing 64 and has a gear 71 securely affixed to the housed end thereof. Gear 71 is in turn, operatively connected to motor MOT-1 (FIG. 3) through means of a gearing arrangement which is not shown and provides the driving power to rotate the dispenser roll in the direction indicated.

As previously noted, the resilient roll cooperates witb the internal surface of the container to provide a movable seal for preventing unwanted toner from escaping from the container. In operation, the roll also functions to deliver a substantially uniform and even quantity of particulate material across the dispensing opening. It has been found that the indivdual cell-like cavities on the roll surface become loaded with toner particles as the roll is rotated through a quantity of such material. Although the exact loading mechanism is not clearly understood, it is believed that the individual cavities fill themselves in a scooplike manner as they are moved through the fine granular material much as an open-mouthed container would fill itself if pulled opening first through a quantity of sand. Because the walls of the cavities are resilient, the cavities also have the unique quality of grasping and holding the particulate material that is received therein. By forming the cavities to a substantially uniform size, each individual cell is capable of loading itself with approximately an equal amount of material. Furthermore, the formation of a uniform cell size insures that the material is evenly distributed across the surface of the roll. In effect, the foamed elastomeric roll as herein disclosed is not only a self loading device but also has the capability of storing and holding a uniformly distributed load across the surface of the member.

After moving through the supply of particulate material in the container, the toner ladened roll surface then moves sequentially past upper boss 72, the curved section 77 of sidewall 45, and lower boss 76 before passing into dispensing opening 48. As noted above, the roll surface is compressed slightly by upper boss 72 to prevent the supply of material in the container from escaping. However, the mechanical biasing pressure is insufficient to destroy the rolls unique loading and holding properties. Although some toner may be dislodged as the deformed roll surface is moved past the protruding surface, the amount of toner removed is equally distributed across the roll surface so that the uniformity of loading is relatively undisturbed. After moving past boss 72, the resilient roll recovers slightly and comes in sliding contact with the interior surface of arcuate wall section 77. The curved wall surface acts to constrain the roll surface to further support the toner particles within the cavities as the roll is forwarded toward the dispensing opening.

It has been found that two distinct mechanisms, used alone or in combination, can be employed to remove particulate material from the surface of the open-celled elastomeric roll. The first method is to deform the resilient roll surface just prior to its entering the dispensing opening so that further rotation of the roll causes the roll surface to spring back to its original posture as it passes into the opening. It should be understood that the roll is sufficiently deformed so that the toner in/on the roll surface is mechanically thrown into the opening as the roll recovers. Secondly, the particulate material can also be mechanically pushed from the roll surface by means of a stationary compressing member or the like place in interference with the roll surface. As the roll moves toward the stationary compressing member, the surface of the roll is deformed to enlarge the cavity openings. Further movement of the roll into the member causes the granular material to be pushed or forced from the surface of the roll.

In the instant embodiment of the present invention, both methods of removing toner material from the roll surface are employed. However, it should be quite clear that either of these two methods could be used alone or in any combination thereof to dispense material from the roll surface without departing from the teachings of the present invention. Referring now specifically to FIG. 5, two bosses 73 which protrude into the path of movement of the roll surface are located on the sidewalls of the container adjacent to container opening 48. As the roll is rotated in the direction indicated the right-hand boss as shown in FIG. 5, acts to compress the roll prior to its entrance into opening 48. Toner material supported in the surface cavities is mechanically thrown from the roll surface as the resilient roll moving into the opening springs back to its original shape. Further rotation of the roll through the opening brings the roll surface into biasing contact with a second boss 73 associated with sidewall 54 of the container. The second protruding boss pushes against the upwardly moving roll surface to scrap or push any toner material from the roll which may still be remaining thereon from the cavities. By using this two step toner removal technique, complete and thorough toner dispensing is accomplished within the dispensing opening.

An antibridging device is provided in the present apparatus to insure that a continuous flow of toner material moves downwardly through the container into contact with the dispensing roll. As previously noted, finely divided particulate material, under certain conditions, tends to agglomerate and/or form bridges in the container to impede the flow within the container. As illustrated in FIG. 3, a rubber-headed striker 68 is periodically tapped against the sidewall of the container with sufficient force to dislodge or breakup bridges and agglomerates. The striker is mounted on a flexible arm 66 which is, in turn, would in torsion spring fashion about shaft 67 to hold the striker 68 in contact with the container. A lifting mechanism (not shown) acting against the spring force is operatively connected to control unit 65 and periodically raises the striker and arm assembly away from the sidewall of the container. Releasing the arm causes the striker to hit the side of the container with sufficient force to eliminate bridging or blocking of the toner. Because the present dispensing roll is not dependent on a pressure head for its operation, it is capable of dispensing entirely all the particulate material that is brought into contact with its surface. This unique function of the roll coupled with the antibridging mechanism gives the dispensing container of the instant invention the capability of entirely emptying the contents of the container.

Figure 2:
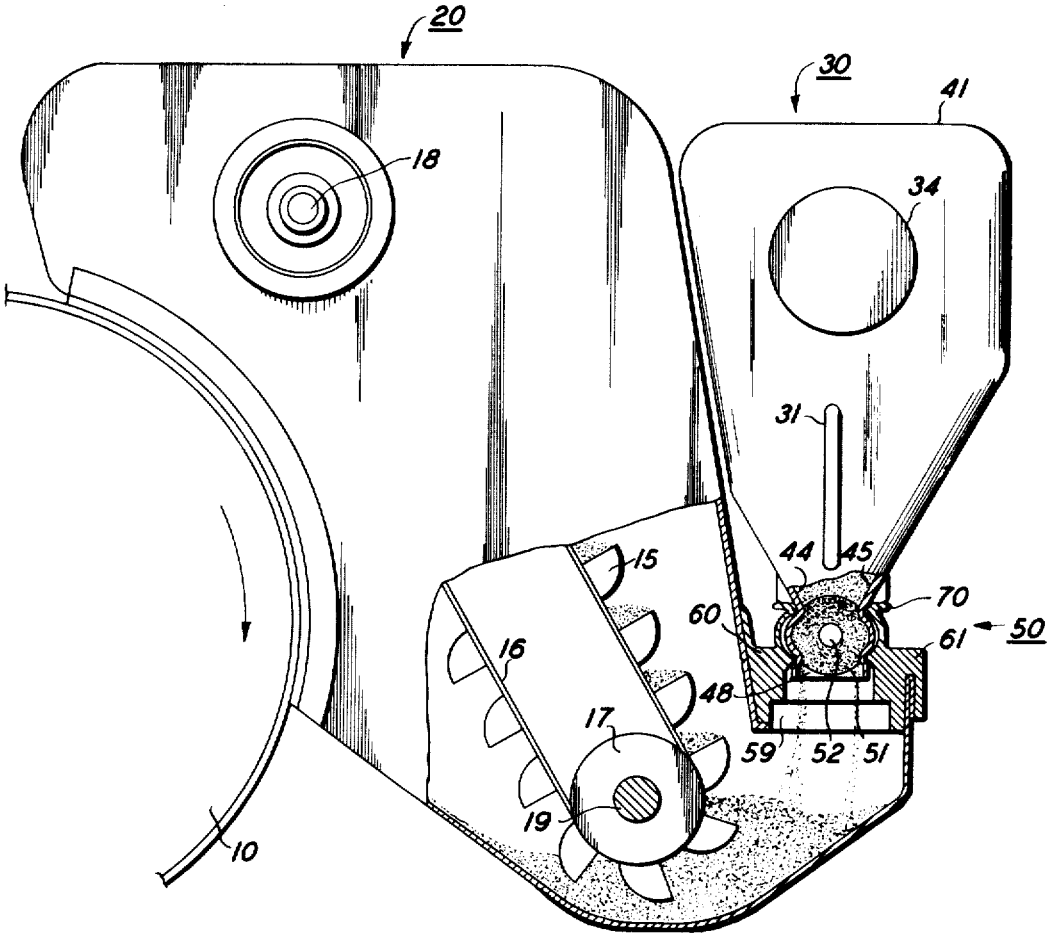

In order to maintain the automatic xerographic apparatus in condition for continuous operation, it is contemplated that a toner deplete dispensing unit will be replaced in the apparatus with a second freshly charged unit. The first unit may be refilled with particulate material or disposed of, as desired. However, it is quite probable, and in certain instances desirable, that the unit be left in the machine and recharged with particulate material as needed. In this case, as illustrated in FIG. 2, the front end of the container is provided with an opening arranged to receive a screw-on cap 34 through which the new toner material may be added directly into the dispensing unit without removing the unit from the support rails.

Figure 6:
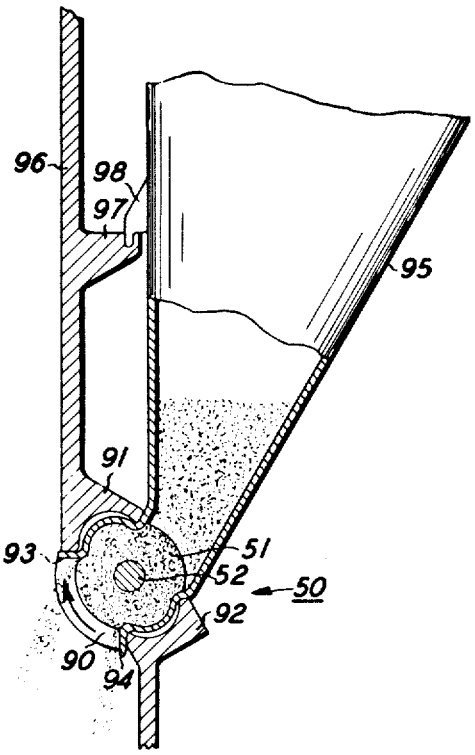
FIG. 6 is a partial side elevation of the toner dispenser of the present invention illustrating the dispenser roll mounted in a position to dispense toner material through the sidewall of a xerographic developer housing.

Furthermore, the dispensing apparatus of the present invention is not limited to dispensing toner material downwardly through the bottom of a container. As illustrated in FIG. 6, the dispensing roll may be mounted in the container so that particulate material contained therein is dispensed sidewardly through the sidewall of a xerographic developer housing or the like. Dependent guide and support members 91, 92 are formed in the sidewall 96 of the developer housing and are arranged so that the guide rails surfaces therein receive in sliding relation the sidewalls 93 and 94 of the toner container 95. To further support the container in relation to the developer housing, a female support rail in the sidewall 96 is arranged to coact with male support rail 98 molded in the toner container. Dispensing unit 50 is rotatably mounted in the lower portion of the toner container and comprises a resilient open celled dispensing roll 51 securely affixed to shaft 52. The resilient roll functions, as herein described to seal the particulate material in the container and to dispense a uniform quantity of toner material through dispensing opening 90 as the roll is rotated in the direction indicated.

While this invention has been described with reference to the structure disclosed herein, it is not confined to the details set forth and this application is intended to cover modifications and changes which may come within the following claims.

We claim:

[1. Apparatus to dispense a finely divided xerographic toner including a housing having end walls and elongated sidewalls for retaining toner therein, said end walls and sidewalls coacting to form an elongated opening in the bottom of the housing, a resilient cylindrical member having an outer surface formed of an opened celled material having cavities of such a size as to be capable of holding therein toner to be transported thereby, the open celled cavities also being of such a size that when expanded they are capable of permitting toner to be discharged therefrom, a loading station above and in communication with said cylindrical member, a discharge station beneath and in communication with said cylindrical member, said sidewalls positioned to extend downwardly terminating in boss members extending a substantial distance into said cylindrical member to expand the open-celled cavities at the loading station which is located between said boss members, supplemental boss means below said first mentioned boss members extending a substantial distance into said cylindrical member adjacent said discharge station whereat said open-celled cavities are expanded to permit the toner to be discharged therefrom, an intermediate conveying zone between said stations whereat said open-celled cavities are maintained in a nonexpanded state for retaining toner therein and transport means for rotating said cylindrical member whereby sequential portions of its surface move through said loading station whereat toner is received into the expanded open-celled cavities thereof through said conveying zone with the open-celled cavities in a nonexpanded state and through said discharge station whereat the toner is discharged from the expanded open-celled cavities.]

[2. The apparatus as set forth in claim 1 wherein said end walls and said sidewalls extend upwardly to form a bottle for containing toner to be dispensed.]

[3. The apparatus as set forth in claim 1 wherein said cylindrical member is formed of an elastomeric polyurethane foamed rubber.]

[4. The apparatus as set forth in claim 1 and further including means associated therewith to periodically tap at least one of said walls to prevent toner material from agglomerating.]

*5. A totally enclosed toner containing and dispensing unit capable of being operatively mounted upon and removed from a xerographic developing system including*

*guide means associated with the developing system for slidably receiving a toner containing and dispensing unit therein and guiding said unit into an operative position in relation to said developer system,*

*said toner containing and dispensing unit comprising an enclosed container for supporting a quantity of finely divided toner material, said container having an elongated opening formed by the cooperation of the sidewalls and endwalls thereof through which toner is capable of being dispensed from said container and further comprising,*

*a movable seal rotatably supported within said elongated opening for preventing toner from escaping from said container when said movable seal is in a stationary condition and for dispensing toner from the container when said seal is rotated,*

*said container having rail means complementary to said guide means whereby said container is capable of being slidably received by said guide means and moved into an operative position in regard to said developing unit,*

*drive means operatively associated with said developing system being capable of imparting a rotating motion to said movable seal, and*

*coupling means operatively associated with said movable seal extending outside said container and being arranged to engage said drive means when said container is moved to an operative position.*

*6. The apparatus of claim 5 wherein said container is funnelled towards said elongated opening by inwardly extending the sidewalls thereof.*

*7. The apparatus of claim 6 wherein said rail means are located upon the inwardly extending sidewalls of said container substantially opposite said movable seal.*

*8. The apparatus of claim 5 wherein said container is formed of a blow molded plastic material.*

*9. The apparatus of claim 5 wherein said movable seal comprises an open celled elastomeric formed polyurethane material resiliently urged into biasing contact against the sidewalls of said elongated opening.*

*10. The apparatus of claim 5 further including means to periodically agitate said container to prevent toner supporting therein from agglomerating.*

References Cited

The following references, cited by the Examiner, are of record in the patented file of this patent or the original patent.

UNITED STATES PATENTS

| | | | |
|---|---|---|---|
| 2,800,252 | 7/1957 | Wahl | 222—196 X |
| 3,147,890 | 9/1964 | Mittelsteadt | 222—325 X |
| 3,204,832 | 9/1965 | Barber | 222—196 |
| 1,090,120 | 3/1914 | Scott | 222—202 |
| 3,608,792 | 9/1971 | Hudson | 222—407 |
| 2,329,666 | 9/1943 | Syverud | 222—414 X |
| 3,128,015 | 4/1964 | Wallis | 222—414 X |
| 3,172,574 | 3/1965 | Hiler et al. | 222—414 X |
| 3,224,649 | 12/1965 | Gunto | 222—199 |
| 3,399,652 | 9/1968 | Gawron | 222—57 X |
| 3,459,337 | 8/1969 | Williamson | 222—333 X |
| 1,855,214 | 4/1932 | Alton | 222—414 |

ROBERT B. REEVES, Primary Examiner

D. A. SCHERBEL, Assistant Examiner

U.S. Cl. X.R.

222—202, 325, 407